United States Patent [19]

Voll et al.

[11] 4,439,401

[45] Mar. 27, 1984

[54] PROCESS AND APPARATUS FOR THE PRODUCTION OF CARBON BLACK

[76] Inventors: Manfred Voll, Greifenhagenstrasse 11, 6450 Hanau 9; Lothar Rothbühr, Volkerstrasse 10, 503 Hermülheim; Gerhard Kühner, Liesingstrasse 1, 6450 Hanau 9, all of Fed. Rep. of Germany

[21] Appl. No.: 359,856

[22] Filed: Mar. 19, 1982

Related U.S. Application Data

[60] Continuation of Ser. No. 191,519, Sep. 29, 1980, abandoned, which is a continuation of Ser. No. 946,420, Sep. 25, 1978, abandoned, which is a division of Ser. No. 769,785, Feb. 17, 1977, abandoned.

[30] Foreign Application Priority Data

Mar. 1, 1976 [DE] Fed. Rep. of Germany ....... 2608417

[51] Int. Cl.³ ............................ C09C 1/48; B05B 1/14
[52] U.S. Cl. .................................. 422/150; 239/424.5; 239/558; 239/567; 422/156; 422/310
[58] Field of Search .............................. 422/151–158, 422/310; 239/420, 422, 424.5, 566, 567, 558, 559

[56] References Cited

U.S. PATENT DOCUMENTS

| | | | |
|---|---|---|---|
| 777,680 | 12/1904 | Lassoe et al. | 239/559 |
| 2,793,081 | 5/1957 | Tinker | 239/567 |
| 2,809,098 | 10/1957 | Larson | 422/156 X |
| 2,857,204 | 10/1958 | Gross | 239/559 X |
| 2,917,370 | 12/1959 | Edminster et al. | 422/150 X |
| 2,933,259 | 4/1960 | Raskin | 239/559 |
| 2,971,822 | 2/1961 | Williams | 422/151 |
| 3,595,618 | 7/1971 | Kiyonaga et al. | 422/151 |
| 3,701,480 | 10/1972 | Kuhner | 239/340 |
| 3,761,577 | 9/1973 | Dahmen et al. | 422/152 |
| 3,913,845 | 10/1975 | Tsuji | 239/567 |
| 4,014,654 | 3/1977 | Howell | 422/156 |
| 4,093,705 | 6/1978 | Kraus et al. | 422/150 |

*Primary Examiner*—Michael S. Marcus
*Attorney, Agent, or Firm*—Cushman, Darby & Cushman

[57] ABSTRACT

Carbon black is produced in a flow reaction by spraying a hydrocarbon containing liquid feedstock with the aid of a propellant gas into a stream of hot reaction gases produced by burning a fuel, the feedstock-propellant gas-jet enters the reaction zone with a spraying angle that is greater than the spreading angle of a free jet. There is also described an apparatus for carrying out the process which comprises a binary injector supporting an atomizing nozzle whose head has several channels which are adjusted from zero degrees to different angles to the longitudinal axis of the nozzle.

4 Claims, 11 Drawing Figures

PROCESS AND APPARATUS FOR THE PRODUCTION OF CARBON BLACK

This is a continuation of application Ser. No. 191,519 filed Sept. 29, 1980, now abandoned, which itself was a continuation of Ser. No. 946,420, filed Sept. 25, 1978, now abandoned, which itself was a divisional of Ser. No. 769,785, filed Feb. 17, 1977, now abandoned.

BACKGROUND OF THE INVENTION

The invention concerns a process for the production of carbon black in a flow reactor by spraying a hydrocarbon containing liquid feedstock by means of a propellant gas into a stream of hot reaction gases produced by burning a fuel as well as an apparatus for carrying out the process.

For the production of finely divided carbon blacks which are versatilely used as reinforcing fillers and black pigments the furnace black process is of even greater significance because of its industrial efficiency and versatility.

In the furnace black or oven black process a mostly gaseous fuel is burned with an oxygen containing gas (air) in a closed, fire resistant lined reactor in order to produce the temperatures necessary for the formation of carbon black. The feedstock, generally an aromatic oil, is nozzled in the hot flue gases formed thereby. The feedstock vaporizes and is changed by cracking and partial combustion into carbon black and flue gases which themselves still contain burnable components. After the completion of the carbon black forming reaction the carbon black-flue gas mixture is quenched by spraying in water. The furnace black process, since it is carried out in closed apparatus, is environmentally desirable and permits the production of carbon blacks of different particle sizes and structure with high capacity. Because of the advantages which are exhibited compared to other processes of producing carbon black there has been constant work to shape the process still more flexibly in order to make it possible to produce carbon blacks for all fields of use exclusively by the carbon black process.

It is known that to produce both high quality furnace blacks and also high abrasion resistance rubber blacks a very rapid vaporization and mixing in of the liquid carbon black feedstock into the reaction gases is necessary.

In order to make possible a quick vaporization of the carbon black feedstock it is finely divided with the help of atomizing nozzles. Both binary and unary nozzles are used.

A typical form of an injector for liquid carbon black feedstock with a binary nozzle is described in German AS No. 1,625,206 (or related Kühner U.S. Pat. No. 3,701,480). In that patent the carbon black feedstock is brought in in a state of acceleration caused by a propellant gas (atomizing gas) and leaves an aerosol from a cylindrical or Laval shaped nozzle. Carbon black feedstock and propellant gas thereby are under increased pressure. With such or similar arrangements there is indeed obtained a very fine distribution of the carbon black feedstock and therewith a high vaporization velocity. However, it is disadvantageous that the carbon black feedstock-propellant-mixture thereby leaves in a restricted manner in a strongly concentrated free jet (opening angle about 15°). As a result the mixing in of the reaction gases produced by burning the fuel is limited in a relatively slow and non-uniform manner.

While the carbon black formation already has begun in the peripheral zones of the free jet encased by the reaction gases, in the nucleus of the jet a thorough mixing with the reaction gases has not yet occurred.

Other process variants use for atomization of the carbon black feedstock unary nozzles in which the carbon black feedstock is atomized without the help of a propellant, in most cases in the form of a hollow cone. These atomizing nozzles offer the advantage that the feedstock can leave with large spraying angles and be distributed over a large surface area so that it makes it easier to have a thorough mixing with the reaction gases. On the other hand, the disadvantages are that a unary atomization leads to substantially larger liquid drops than the binary atomization so that the vaporization speed of the liquid carbon black feedstock is reduced. A more serious disadvantage to lower vaporization speed is the formation of coke which both can occur in the free reaction space of the furnace and lead to small coke particles (grit) in the carbon black and also can lead to greater coke deposits on the walls of the reactor. The problem of the coke deposits on the reactor walls occurs especially strongly with relatively narrow and highly loaded furnaces.

SUMMARY OF THE INVENTION

An object of the invention is the development of a process for the production of carbon black in flow reactors by spraying in a hydrocarbon containing liquid carbon black feedstock by means of a propellant gas into a stream of hot reaction gases produced by burning a fuel. The process is characterized by the carbon black feedstock-propellant gas-jet entering into the reaction gases with a spraying angle which is greater than the spread angle of a free jet.*

*The carbon black feedstock can be mixed into the propellant gas at a point with the range of directly before or inside the nozzle.

A preferred variant of the process provides that in the atomization there is formed a complete cone with an opening angle of 30°–180°, preferably 40°–120°, especially 60°–90°.

Another, likewise advantageous process variant provides that in the atomization a full cone is built with an opening angle of 30°–180°, preferably 40°–120°, especially 60°–90°, whereby the concentration of the atomized carbon black in the region of the full cone can be held smaller, the same or larger than in its outer zones.

The atomization finally can also take place in the form of a smooth jet.

The preferred propellant gases are air or steam.

A further object of the invention is the development of an apparatus for carrying out the described process. The apparatus is characterized by a binary injector carrying an atomizing nozzle whose head has several channels which are adjusted from zero degrees to different angles to the longitudinal axis of the nozzle.

The carbon black feedstock feed line arranged in the injector and the nozzle orifice suitably have an interval which is 1.5 to 6 times the central diameter of the nozzle. The apparatus furthermore is preferably so constructed that the channels in the head of the atomizing nozzle are so distributed over its periphery that they form an angle to each other between 5° and 25°, preferably between 10° and 20°.

The channels in the head of the nozzle can be arranged circularly around the axis of the nozzle and can form toward the nozzle axis an angle of 15° to 90°, preferably 20°-60°, particularly 30° to 45°. A binary atomizing nozzle constructed of this type combines the advantages of unary and binary atomizing nozzles by producing as the spray pattern a hollow cone with proportionally large spraying angle.

It is indeed known in principle that by appropriate construction the outlet opening of a binary nozzle can be transformed to a ring slot from which the atomized liquid leaves in the form of a hollow cone. However, these types of nozzles are little suited for the continuous operation in a carbon black furnace. The simple and sturdy nozzle construction of the invention in which liquid and propellant pass out of a large number of small drilled holes which are arranged circularly around the nozzle axis and determine the spraying angle through their inclination to the nozzle axis eliminate this deficiency.

In a similar manner to the previously described binary-hollow sphere nozzles by suitable arrangement of the outlet drilled holes there can also be produced nozzles with other spray characteristics.

The channels in the head of the nozzle for this purpose can lie in several concentric circles around the nozzle axis whereby here the channels in each case form a circle toward the nozzle axis of an angle of 15° to 90°, preferably 20° to 60°, particularly 30° to 45°, the channels of one circle have toward the channels of a different circle the same or different angles and the diameter of the channels can be the same or different.

If the atomization should take place in the form of a flat-section jet the apparatus is so constructed that the channels in the head of the spraying nozzle in one plane are preferably arranged symmetrically to the nozzle axis.

Finally the object of the invention also is the carbon black obtained according to the described process with the binary injector of the invention.

The nozzle construction and its variants of the invention permit the atomization of carbon black feedstock in furnaces of any shape. Conditioned by the fact there there can be realized any size spraying angle the carbon black feedstock is distributed over a very large cross-section. Thereby there is possible a very quick intermixing with the hot gases flowing into the furnace. The intermixing is promoted by the injector action of the propellant gas spheres leaving the nozzle. In contrast to unary atomizing nozzles which likewise spread the liquid drops over a large surface, the very many fine atomizers of the binary nozzle are made prominent as an especial advantage. Through the smaller drop size there results a substantially higher vaporization speed of the atomized liquid in the binary nozzle of the invention. From this there likewise results the quick formation and mixing of the oil vapors with the hot gases in the furnace. On the other hand, through the quick vaporization the range of the liquid oil drops is sharply reduced. Therefore a burner constructed with binary nozzles of the invention can still be operated at very short distances from the furnace wall or installations without coke deposits occurring. With such nozzles therefore burner positions are possible which are not realizable with unary nozzles or normal binary nozzles. The advantages of the binary nozzles of the invention are particularly strongly valuable if the atomized carbon black feedstock spheres just fill the furnace diameter at the point of injection.

The compressed air requirement of a binary nozzle of the invention for the recovery of carbon black is proportionately small. The air throughput customarily amounts to about 5 to 10% of the total amount of air introduced into the reactor.

The nozzles are particularly suited for the insertion under extreme temperature conditions since the greatest part of the nozzle can be cooled by a cooled injector lance. The outlet holes themselves besides are cooled by the propellant and the atomized liquids.

BRIEF DESCRIPTION OF THE DRAWINGS

The invention will be understood best in connection with the drawings wherein.

Figure 1:
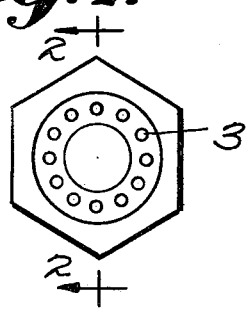
FIG. 1 is a front view of the atomizing nozzle of a binary injector of the invention and with a single circle of holes as outlet channels.
Figure 2:
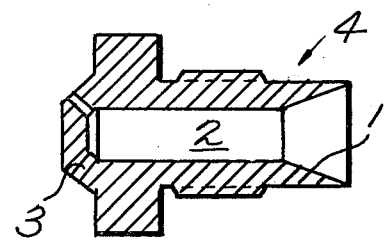
FIG. 2 is a longitudinal section along the line 2—2 of FIG. 1.

Referring more specifically to FIGS. 1 and 2, the atomizing liquid leaves an inlet tube lying in the axis of the nozzle in the area of the funnel shaped inlet 1 in the nozzle 4. In the channel 2 of the nozzle narrowed in contrast to the propellant gas feedpipe propellant gas and liquid are accelerated. Thereby there is attained a distribution of the liquid over the entire nozzle cross-section without utilization of installations. The propellant gas is released through the channels 3 which represent the narrowest cross-section of the nozzle and atomizes the liquid. The channels 3 are arranged in circular fashion around the axis of the nozzle and have to each other an angle of at maximum 25°, preferably about 15°. At this angle of the channels to each other the individual jets leaving the channels blend into a unitary sprayed cone.

Figure 11:
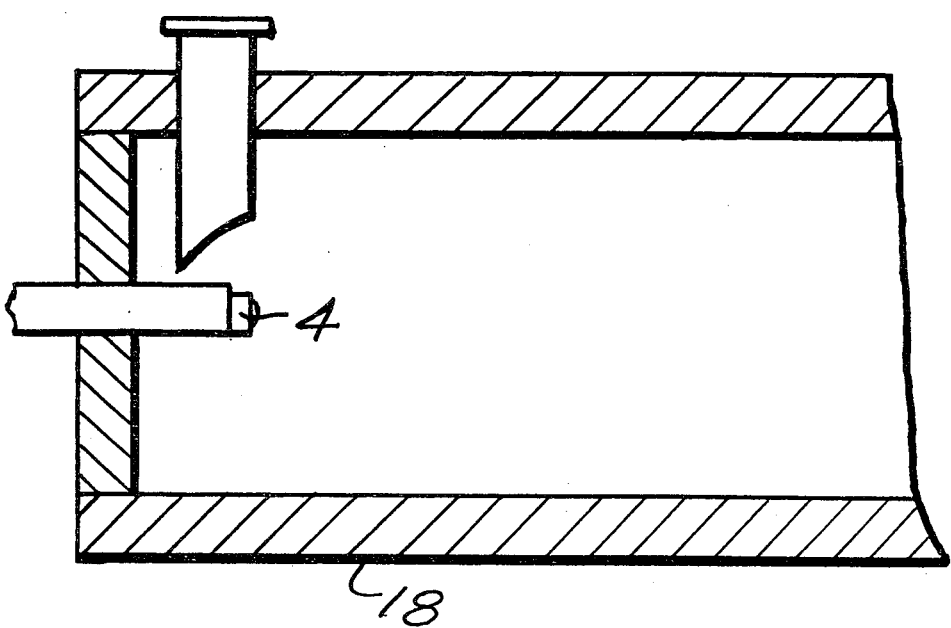
FIG. 11 is a sectional view in elevation of a furnace showing the disposition of the nozzle of the present invention.

As shown in FIG. 11, the nozzle 4 of the present invention is situated at one end of a furnace chamber 18.

Figure 3:
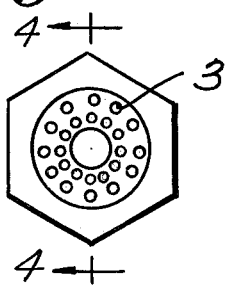
FIG. 3 is a front view similar to FIG. 1, but having two circles of holes arranged as outlet channels.
Figure 4:
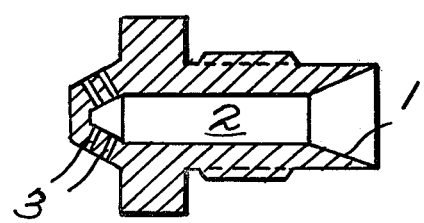
FIG. 4 is a longitudinal section along the line 4—4 of FIG. 3.

The outlet channels can either be arranged in a single series of holes as in FIGS. 1 and 2 or can be distributed in several concentric series of holes as in FIGS. 3 and 4. Since in the second case a larger number of channels can be accommodated in the nozzle the diameter of the individual channels can be reduced for a given propellant gas throughput.

Figure 9:
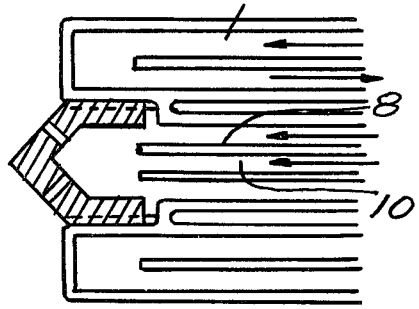
FIG. 9 is a longitudinal section through a binary injector of the invention in which the carbon black feedstock feedpipe ends inside the nozzle; and, FIG. 10 is a longitudinal section through a binary injector of the invention in which the carbon black feedstock feedpipe ends shortly before the atomizing nozzle.
Figure 10:
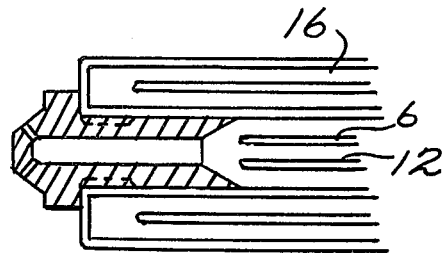

For the use of the nozzles of the invention for atomization of liquid carbon black feedstocks it is especially advantageous to bring the inlet pipe 6 for the carbon black feedstock to a point in the injector shortly before the nozzle as shown at 6 in FIG. 10 or to inside the nozzle as shown at 8 in FIG. 9. The distance between the orifice of the carbon black feedstock pipe situated in the injector and the outlet of the nozzle is 1-6 times the inner diameter of the nozzle. The arrangement of the carbon black feedstock outlets shortly before or in the nozzle has the advantages of optimum fineness, atomizations at a constant rate and avoids disturbances through feedstock inserts in the interior of the injector lance. The carbon black feedstock is introduced through pipe 10 (FIG. 9) or pipe 12 (FIG. 10). Cooling water circulates through pipe 14 (or 16).

Figure 5:
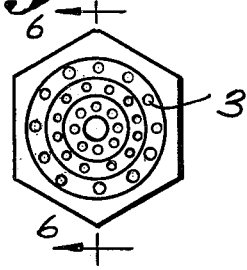
FIG. 5 is a front view illustrating a binary nozzle of the invention having full spherical characteristics.
Figure 6:
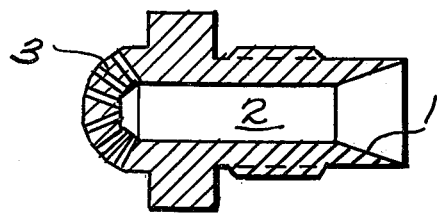
FIG. 6 is a longitudinal section along the line 6—6 of FIG. 5.

In the binary nozzle with complete sphere characteristics according to FIGS. 5 and 6 the outlet bore holes 3 are located in several concentric circles of holes. The bore holes lying on the various circles of holes have different angles to the nozzle axis, i.e., preferably gradated around 15°. A 90° full sphere nozzle accordingly contains for example three concentric circles of holes whose channels in each case are inclined 15°, 30° and 45° to the nozzle axis and in a given case additionally an axial outlet channel.

By suitable dimensioning of the outlet channel there can be further provided that the concentration of the liquid to be atomized inside the full cone is larger, the same or smaller than in the outer zones of the spraying sphere.

Figure 7:
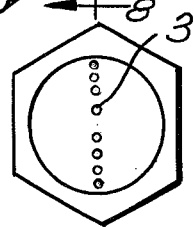
FIG. 7 is a front view of a binary flat section jet.
Figure 8:
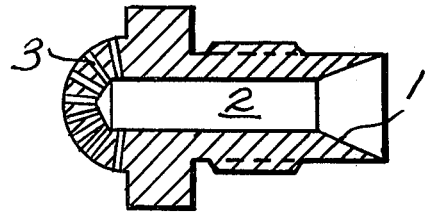
FIG. 8 is a longitudinal section along the line 8—8 of FIG. 7.

If the bore holes which among one another again form an angle of 5° to 25° are arranged in a plane there are obtained binary flat-section nozzles as shown in FIGS. 7 and 8 with any eligible spraying angle in the plane of the outlet channel and an opening angle of about 15° perpendicular to the plane. In an analogous manner several series of outlet channels can be placed in planes parallel to each other on the head of the nozzle.

Depending upon the variability of the nozzle construction and the above mentioned advantages of the binary atomization the binary spherical nozzles of the invention can be used in all current furnace black furnaces. As test values for the coloristic properties of the carbon black there are given the blackness value and the depth of color in polyvinyl chloride (PVC).

For determination of the blackness value the carbon black is mixed with linseed oil in an amount corresponding to its oil demand and with the help of a spatula intensively worked up on a glass plate so that a homogeneous paste forms. The thus obtained paste is spread on a slide between two correspondingly produced pastes of a deeper colored and a less deeply colored standard carbon black. Under a very light lamp the depth of color of the carbon black under investigation is ascertained through the glass by visual comparison with the standard carbon blacks. High values indicated high depths of color.

To ascertain the depth of color in PVC 50 mg of carbon black and 5 grams of a PVC plastisol consisting of 58.8% Vestolit E7003 (PVC), 39.2% dioctyl phthalate and 2% stabilizer were ground together 4×25 and 4×50 revolutions on an Engelsmann-Color rubbing out machine loaded with 100 kg plates. The paste obtained was spread between two correspondingly produced standard pastes on a microscope slide and visually judged under a light lamp through the glass. The judging can either take place on the freshly produced samples or after curing at 150° C. High depths of color in PVC are shown by high values.

DESCRIPTION OF THE PREFERRED EMBODIMENTS

EXAMPLE 1

For comparison of the injection arrangement of the invention with atomizing nozzles of conventional construction there were carried out in a restrictor ring reactor 3 experiments under the most favorable injector position for each carbon black feedstock injector. The furnace black reactor used had the following measurements:

Diameter of the gas combustion space: 350 mm
Diameter of the restrictor ring: 80 mm
Diameter of the reactor space: 165 mm

| Experiment No. | | 1 | 2 | 3 |
| --- | --- | --- | --- | --- |
| Atomizing Nozzle | | binary | unary | binary |
| Spray Angle ° | | hollow cone→60° | hollow cone→60° | free jet |
| Burner Position* | cm | −2 | +4 | −10 |
| Combustion Air Throughput | Nm³/h | 143.9 | 172.2 | 151.0 |
| Atomizing Air Throughput | Nm³/h | 26.0 | 0 | 20.2 |
| Total Air Throughput | Nm³/h | 169.9 | 172.2 | 171.2 |
| Fuel Gas Throughput | Nm³/h | 12.8 | 12.9 | 12.5 |
| Oil Throughput | kg/h | 28.0 | 26.2 | 27.4 |
| Additive Throughput | mg KCl/kg oil | 2113 | 2445 | 2330 |
| Quench Point** | cm | 60 | 60 | 60 |
| Carbon Black Output | kg/h | 10.6 | 12.2 | 12.2 |
| Oil Yield | kg/100 kg | 37.9 | 46.6 | 44.5 |
| ASTM Iodine Adsorption*** | mg/g | 208 | 151 | 210 |
| DBP Number**** | ml/g | 0.45 | 0.49 | 0.44 |
| Blackness Value | | 154 | 139 | 151 |
| Depth of Color in PVC | | 95 | <50 | 79 |

*Distance of the oil outlet from the forward edge of the restrictor ring (negative value = oil outlet before the restrictor ring)
**Measured from the forward edge of the restrictor ring
***According to ASTM D1510
****Dibutyl phthalate number according to ASTM D2414

Although the fuel gas/air ratio and the oil/air ratio in experiments 1-3 are practically constant, there are formed carbon blacks of very different qualities.

The most finely divided carbon black with the highest blackness value is formed in experiment position 1. The experiment position 2 resulted in the coarsest carbon black. The spraying angle in both experiments was the same. The most unfavorable experimental results of Experiment No. 2 were traced back to the too large oil drops in the unary atomization. The very strong coke deposits in and behind the restrictor ring is traced back to the same causes. Only the experiment positions 1 and 3 can be carried out in the reactor without coke deposits.

The superiority of the carbon black atomizing nozzle of the invention compared to conventional binary atomization nozzles is shown particularly on the depth of color attainable with the carbon blacks produced in synthetic resins (e.g., PVC).

The better carbon black qualities and the somewhat lesser yield in experiment 1 are indications that only in this experiment a homogeneous mixing of combustion air and oil occurs.

EXAMPLE 2

Carbon black having the same depth of color in synthetic resins can be produced with the atomizing nozzles of the invention with substantially less insertion of compressed air and higher yields. The following two experiments were carried out in a restrictor ring reactor whose diameter in the gas combustion space was 460 mm, in the restrictor ring 175 mm and in the reaction space 320 mm.

| Experiment No. | | 4 | 5 |
|---|---|---|---|
| Atomizing Nozzle | | binary | binary |
| Spray Angle ° | | free jet | 60° |
| Burner Position | cm | −25 | −15 |
| Combustion Air Throughput | Nm³/h | 2400 | 2400 |
| Atomizing Air Throughput | Nm³/h | 430 | 100 |
| Fuel Gas Throughput | Nm³/h | 195 | 195 |
| Oil Throughput | kg/h | 454 | 378 |
| Quench Point | cm | 107 | 107 |
| Carbon Black Output | kg/h | 117.1 | 126.5 |
| Oil Yield | kg/100 kg | 25.8 | 33.4 |
| ASTM Iodine Adsorption* | mg/g | 284 | 263 |
| DBP Number** | ml/g | 0.62 | 0.70 |
| Blackness Value | | 156 | 156 |
| Depth of Color in PVC | | 78 | 78 |

*According to ASTM D1510
**According to ASTM D2414

Experiments 4 and 5 were carried out in the same restrictor ring furnace. While with Experiment 4 the depth of color only can be attained by insertion of relatively larger amounts of atomizing air, the hollow sphere binary atomizing nozzle in Experiment 5 could be operated with lesser amounts of atomizing air. Accordingly, Experiment 5 has a clear advantage in yield. An analogous installation to Experiment 5 with a unary atomization could not be realized at the burner position because of the formation of coke.

EXAMPLE 3

That the advantages offered by the binary hollow sphere atomization are not limited to restrictor ring furnaces is shown by the following example. In a venturi reactor under otherwise identical conditions carbon black was produced using unary hollow sphere atomizing nozzles and binary hollow sphere atomizing nozzles. The venturi reactor employed had a gas combustion space with a largest diameter of 760 mm, confuser angle of 38°, a diffuser angle of 14° and a diameter at the narrow place of 100 mm.

| Experiment | | 6 | 7 |
|---|---|---|---|
| Atomizing Nozzle | | unary | binary |
| Spray Angle ° | | 78° | 90° |
| Burner Position | inch | −13 | −13 |
| Combustion Air Throughput | Nm³/h | 2600 | 2480 |
| Atomizing Air Throughput | Nm³/h | 0 | 120 |
| Total Air Throughput | Nm³/h | 2600 | 2600 |
| Fuel Gas Throughput | Nm³/h | 200 | 200 |
| Oil Throughput | kg/h | 681.4 | 689.6 |
| Carbon Black Output | kg/h | 375.4 | 374.5 |
| Oil Yield | kg/100 kg | 55.1 | 54.3 |
| ASTM Iodine Adsorption | mg/g | 127 | 128 |
| Tint Strength* | | 120 | 120 |

*According to ASTM D3265-75

In regard to the analytical data and with reference to the industrial rubber properties, the carbon blacks were identical. In using the unary nozzle there began to build up at this burner position a coke deposit from the narrow place while with the binary nozzle even still shorter distances between oil injector and narrow place of the venturi furnace can be realized. The binary nozzle thus is more flexible in regard to the burner position which is of particular advantage for regulation of the tint strength.

EXAMPLE 4

In Examples 1–3 there were used injection nozzles with hollow cone spraying characteristics. Experiment 8 is an example of the use of a binary atomizing nozzle with full cone spraying characteristics. Experiment 8 was carried out in the reactor described in Example 1. Experiments 2 and 3 serve as a comparison.

| Experiment | | 8 | 2 | 3 |
|---|---|---|---|---|
| Atomizing Nozzle | | binary | unary | binary |
| Spray Angle ° | | full cone 90° | hollow cone 60° | free jet |
| Burner Position | cm | +5 | +4 | −10 |
| Combustion Air Throughput | Nm³/h | 136.3 | 172.2 | 151.0 |
| Atomizing Air Throughput | Nm³/h | 42.2 | 0 | 20.2 |
| Total Air Throughput | Nm³/h | 178.5 | 172.2 | 171.2 |
| Fuel Gas Throughput | Nm³/h | 12.6 | 12.9 | 12.5 |
| Carbon Black Feedstock Throughput | kg/h | 28.0 | 26.2 | 27.4 |
| Additive Throughput | mg KCl/kg oil | 1939 | 2445 | 2330 |
| Quench Point | cm | 60 | 60 | 60 |
| Carbon Black Output | kg/h | 12.3 | 12.2 | 12.2 |
| Oil Yield | kg/100 kg | 43.9 | 46.6 | 44.5 |
| ASTM Iodine Adsorption* | mg/g | 168 | 151 | 210 |
| DBP Number** | ml/g | 0.38 | 0.49 | 0.44 |
| Blackness Value | | 153 | 139 | 151 |
| Depth of Color in PVC | | 86 | <50 | 79 |

*According to ASTM D1510
**According to ASTM D2414

From Experiment 8 there can be seen the clear advantages in regard to the carbon black quality which is expressed in depth of color in PVC for the injection device of the invention. Although the throughput of the starting materials and the yields are comparable, there is obtained in Experiment 8 the highest depth of color in PVC and the highest blackness value.

What is claimed is:

1. In an apparatus for producing carbon black, including, in combination, a carbon black reactor furnace and nozzle means disposed in said furnace for spraying a liquid feedstock hydrocarbon and a propellant gas into a stream of hot reaction gases produced by burning a fuel, said nozzle means being of the binary type having a first feed channel for the liquid feedstock hydrocarbon and a second separate feed channel for the propellant gas, the improvement comprising said nozzle means having a longitudinal axis, a nozzle chamber, an inlet orifice at one end of said chamber, a head outlet at the opposite end of said nozzle chamber, said first and second feed channels of said nozzle means both terminating at said inlet orifice, said nozzle chamber having an inner diameter, said inlet orifice of said nozzle chamber being spaced from said head outlet a distance from 1-6 times said inner diameter of said nozzle chamber, said head outlet of said nozzle means having a plurality of channels therein distributed about said longitudinal axis with said channels being distributed over the circumference so that they make with each other an angle of 15° so that the liquid will be sprayed in a hollow cone pattern having an opening angle of between 45° and 120°.

2. The apparatus as claimed in claim 1 wherein the channels in the head outlet of said nozzle means are arranged circularly around the axis of said nozzle means as a plurality of concentric circles.

3. The apparatus of claim 1 wherein the channels form an angle of 30°-45° to the nozzle axis.

4. The apparatus as claimed in claim 1 wherein the diameters of the channels are all the same.

* * * * *